(12) United States Patent
Lang et al.

(10) Patent No.: US 7,222,978 B2
(45) Date of Patent: May 29, 2007

(54) REVERSIBLE MOUNTING FOR MIRROR SUPPORT PLATE

(75) Inventors: Heinrich Lang, Ergersheim (DE); Markus Meier, Markt Nordheim (DE); Richard Reimchen, Ansbach (DE)

(73) Assignee: Lang Mekra North America LLC, Ridgeway, SC (US)

( * ) Notice: Subject to any disclaimer, the term of this patent is extended or adjusted under 35 U.S.C. 154(b) by 0 days.

(21) Appl. No.: 11/209,062

(22) Filed: Aug. 22, 2005

(65) Prior Publication Data

US 2006/0061895 A1 Mar. 23, 2006

(51) Int. Cl.
*G02B 5/08* (2006.01)
*G02B 7/182* (2006.01)
*G60R 1/02* (2006.01)

(52) U.S. Cl. .................................. 359/871; 248/475.1
(58) Field of Classification Search ................ 359/844, 359/871–874, 876, 877; 248/476–480, 475.1, 248/491, 468

See application file for complete search history.

(56) References Cited

U.S. PATENT DOCUMENTS

| | | | | |
|---|---|---|---|---|
| 4,867,408 A | * | 9/1989 | Ozaki | 248/483 |
| 4,877,214 A | * | 10/1989 | Toshiaki et al. | 248/483 |
| 5,355,255 A | * | 10/1994 | Assinder | 359/871 |
| 5,604,645 A | | 2/1997 | Weaver | |
| 5,615,054 A | * | 3/1997 | Lang et al. | 359/844 |
| 6,328,451 B1 | * | 12/2001 | Lang | 359/871 |
| 2003/0133205 A1 | * | 7/2003 | Hayakawa | 359/871 |

FOREIGN PATENT DOCUMENTS

| | | |
|---|---|---|
| DE | 25 49 555 C2 | 12/1977 |
| DE | 4133330 A1 * | 4/1993 |
| DE | 200 15 092 U1 | 4/2002 |

* cited by examiner

*Primary Examiner*—Mark A. Robinson
*Assistant Examiner*—Mark Consilvio
(74) *Attorney, Agent, or Firm*—McNair Law Firm, P.A.

(57) ABSTRACT

A mirror support plate for use with vehicles, which can be attached to a holder by way of a chucking and sliding connection. The support plate is provided with two ridges which protrude from its back and include at least one projection which extends towards the other ridge in such manner that the border region of the holder can be inserted between the back of the holder and the projections. The mirror support plate includes a first elastic element and second elastic element, which function as upper and lower elements. The elastic elements are designed so that as the holder is inserted, it elastically deforms the lower one of the first and second elastic elements towards the back of the mirror support plate allowing outer edges of the holder to move into frictional contact with the projections and the back of the support plate and its upper end into interlocking contact with the upper of the first and second elastic elements.

14 Claims, 4 Drawing Sheets

REVERSIBLE MOUNTING FOR MIRROR SUPPORT PLATE

BACKGROUND OF THE INVENTION

The present invention relates to a mirror support plate as well as to a mirror arrangement incorporating the mirror support plate.

Rear-view mirrors in vehicles generally comprise a mirror pane which is attached onto a mirror support plate. The mirror support plate may be a simple frame or a housing in which the mirror pane is attached fixedly or so it may be adjustable either manually or by motor. This mirror support plate is attached onto a holder which is in turn attached to the vehicle.

In order to replace damaged mirror panes or support plates it is known to detach the mirror support plate from the holder by way of a detachable chucking and sliding connection. For this purpose the holder has two plate-shaped border regions arranged in opposed relation. The mirror support plate has two ridges on its back from which extended projections are designed so that the border regions of the holder can be inserted between the back of the mirror support plate and the projections.

A rigid stop against which the inserted holder is interlockingly pressed is provided in the insertion direction toward the upper end of the mirror support plate. The inserted mirror support plate is then held on the holder by its own weight. The sliding connection described above is preferably made in the form of a chucking and sliding connection whereby the border regions of the holder are fixed in a frictionally engaged manner between the back of the mirror support plate and the projections. EP 0 609 508 B1 discloses such a mirror arrangement with chucking and sliding connection where projections and border zones are complementary, so that the mirror support plate can be installed on the holder from the front and can then be displaced in insertion direction.

Due to the vibrations which occur during operation of the vehicle, a simple chucking connection is disadvantageous because the mirror support plate is prone to move relative to the holder. In the worst case the chucking connection may fail. For this reason EP 0 799 744 B1 proposes on the one hand a wedge-shaped arrangement of the ridges and the border regions of the holder in order to ensure automatic centering as a result of its own weight. Alternatively, the instant invention proposes providing a receiving channel on the holder which is open toward the top. Anchoring ridges on the mirror support plate are designed to cooperate with the channel so that when the holder is inserted from below into the mirror support plate it is held in position.

Left and right mirror support plates, as now known, are different, that is different mirror support plates must be produced and kept in stock for the left and for the right vehicle side because of the above-mentioned chucking and sliding connection which is designed for only one direction of insertion. This is costly.

It is therefore the object of the present invention to provide a mirror support plate with a chucking and sliding connection that can be used as a left-side as well as a right-side mirror support plate. EP 0 609 508 B1 discloses such a mirror arrangement with a chucking and sliding connection whereby the projections and border region are designed so as to complement each other, so that the mirror support plate can be installed from the front on the holder and can then be displaced in the insertion direction.

In particular due to the vibrations occurring in operation, a mere chucking connection is disadvantageous because the mirror support plate could then move relative to the holder. EP 0 799 744 B1 therefore proposes on the one hand to dispose the ridges and border regions of the holder in a wedge shape in order to thus ensure automatic centering as a result of their own weight. Alternatively, the instant invention proposes to provide a receiving channel open at the top into which anchoring ridges are configured in a complementary fashion to engage and hold the mirror support plate with the holder when the holder is inserted from below into the mirror support plate.

Left and right mirror support plates of the invention are constructed to be interchangeable by rotation around its axis. This means that the mirror support plate provided for the right vehicle side is identical with the one for the left vehicle side when rotated around its longitudinal and transversal axis. In known mirror support plates constructed for one direction insertion, different mirror support plates must be manufactured and stored for the left and right vehicle side due to the above-mentioned chucking and sliding connection. This is costly.

It is, therefore, the object of the present invention to provide a mirror support plate with a chucking and sliding connection which can be used equally as a left and a right mirror support plate.

Another object of the invention is a mirror support plate which can be attached to a support by means of a chucking and sliding connection provided in that the mirror support plate has two ridges protruding from its back, each of which includes at least one projection which extends towards the other ridge in such manner that the border region of the holder can be inserted between the back of the support plate and the projection and is held in this position.

According to the invention, a mirror support plate is provided with a first elastic element and a second elastic element. The elastic elements are designed so that the holder may be inserted from either end of the support plate. During insertion, it engages and deforms the lower of the first and second elastic elements elastically in the direction of the back of the mirror support plate. The holder then moves into interlocking contact with the other or upper first and second elastic elements. The terms "upper" and "lower" refer here to the direction of insertion.

The holder can be inserted equally from one or the other end, in the direction of the two ridges, into the chucking and sliding connection. Depending on the direction of insertion, the uppermost one of the elastic elements in the insertion direction serves as a stop to delimit the insertion movement, i.e. the holder bears upon this upper elastic element. The other elastic element which is the lower one in the insertion direction, is deformed elastically downward by the holder as it is inserted and urged into position. With a completely inserted holder, the lower elastic element will snap back into its starting position or substantially into its starting position and, thus, fix the holder interlockingly in place. In an alternative embodiment the lower elastic element remains elastically deformed, even when the holder is completely inserted, so that it exerts an elastic force upon the holder which force acts to prevent the mirror support plate from sliding out of the holder. The holder is pressed advantageously against the projections of the lower elastic elements causing the frictional engagement of the chucking connection to thus be heightened. In either case a relative movement of the mirror support plate on the holder due to vibration is advantageously reduced.

The first and the second elastic element thus serve alternately, depending on the direction of insertion, one time as upper stop against the direction of insertion and the other time as lower force provider acting against any exiting movement of the holder against the direction of insertion. Thereby it is advantageously possible to provide only one mirror support plate for the left and the right vehicle side. Depending on the vehicle side, the mirror support plate is rotated around its axis by 180° and is attachable to the holder on either vehicle side. This action is possible because either of the elastic elements are able to function equally as the upper stop or the lower force transmitter. This is achievable as both of the elastic elements are elastically deformable allowing whichever is the lower one to be depressed as the holder is inserted.

The mirror support plate and/or the elastic elements are preferably made of plastic, as this reduces the cost of manufacture, and particularly, allows the elastic elements to have the desired deformation characteristics, i.e. spring hardness, etc. The mirror support plate and the elastic elements can advantageously be made in one piece and can thus be produced in one single forming process.

In an advantageous embodiment several projections extend from at least one ridge. The holder is preferably provided with a complementarily configured border region such as described in EP 0 609 508 B1. The chucking and sliding device described therein is incorporated to this extent in its entire content into the present application.

In a preferred embodiment of the present invention, the elastic elements have a projection on their upper inner end constructed to provide a stop. The projections of the lower elastic elements in the direction of insertion, engage behind the inserted holder when in the inserted position. The lower elastic elements are advantageously still elastically deformed when engaged with the completely inserted holder which allows the elastic force to first act against outward movement of the holder while urging it against the projections on the ridge. The structure is such that the chucking and sliding connection under continued elastic deformation of the lower elastic element is easily undone. The projection on the elastic element supports the holder both interlockingly and from sliding out. The projections on the elastic elements are designed so that movement of the holder against the direction of insertion exerts a sufficient force upon the lower elastic element to further deform the latter, and thus, free the holder for outward movement. In this manner, it is possible to simply pull the mirror support plate against the direction of insertion into the holder for removal from the holder.

The first and/or second elastic elements comprise several elastic elements, so that a twisting of the inserted holder around the vertical axis is prevented.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
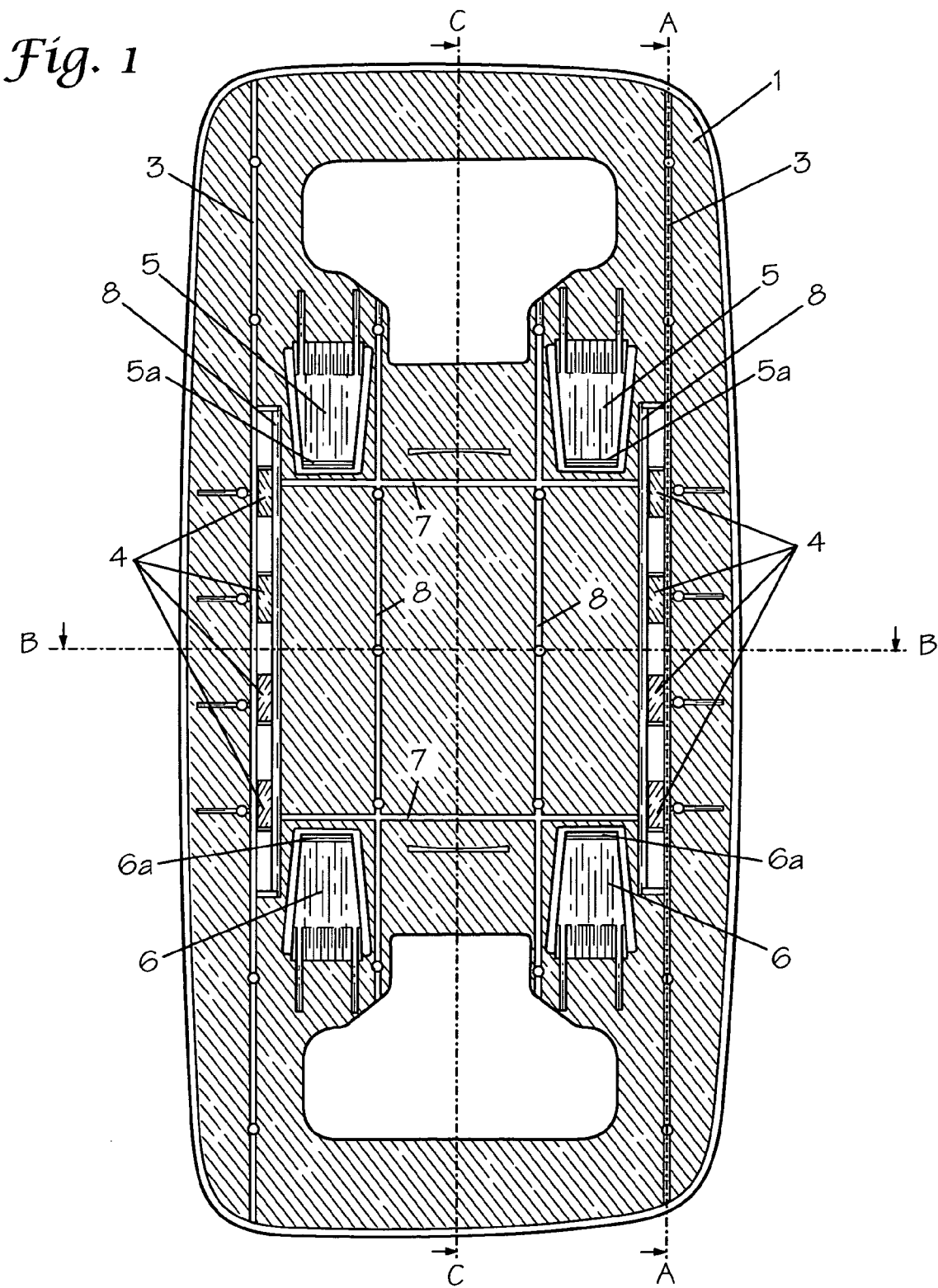
FIG. 1 is a rear plan view of a mirror support plate in accordance with the present invention.

The mirror support plate 1 in the embodiment of the present invention shown in FIGS. 1–5 comprises two essentially parallel ridges 3 forming a receiving channel. Each ridge includes a plurality of projections 4 (preferably four) arranged along their inward sides and extending towards the opposing ridge 3. A grate consisting of vertical and transverse bars 7 and 8 is formed inwardly of and slightly below the lower surface of projections 4.

Figure 5:
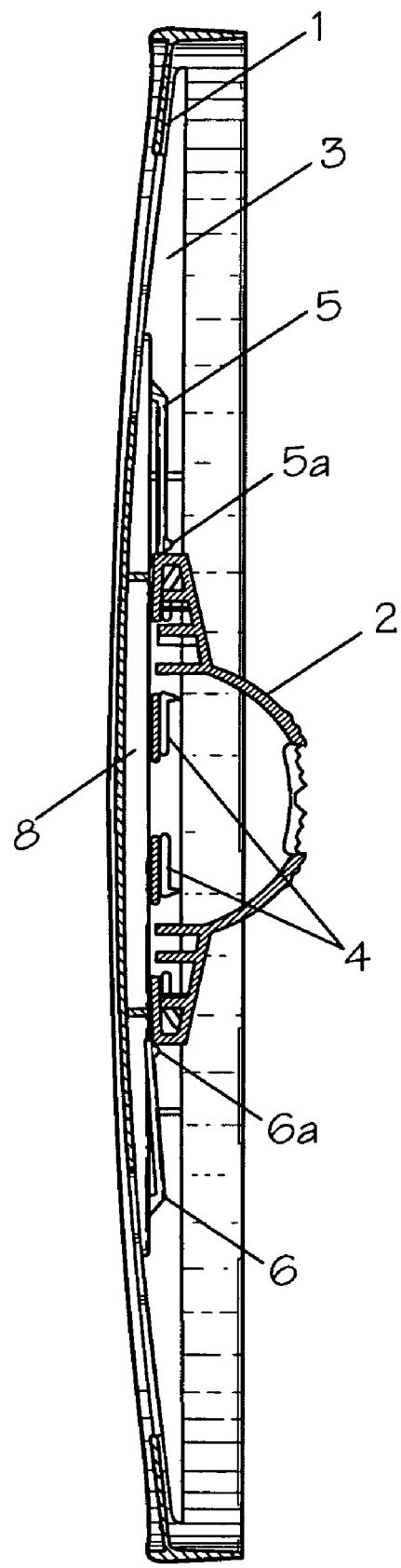
FIG. 5 is a side section view similar to FIG. 2 with the holder inserted.

As shown in FIG. 5, holder 2 can be mounted with support plate 1 when its border regions are inserted between the grate comprising bars 7 and 8. of the mirror support plate and the projections 4. The holder is held in place by frictional engagement between the grate and the projections 4.

Figure 2:
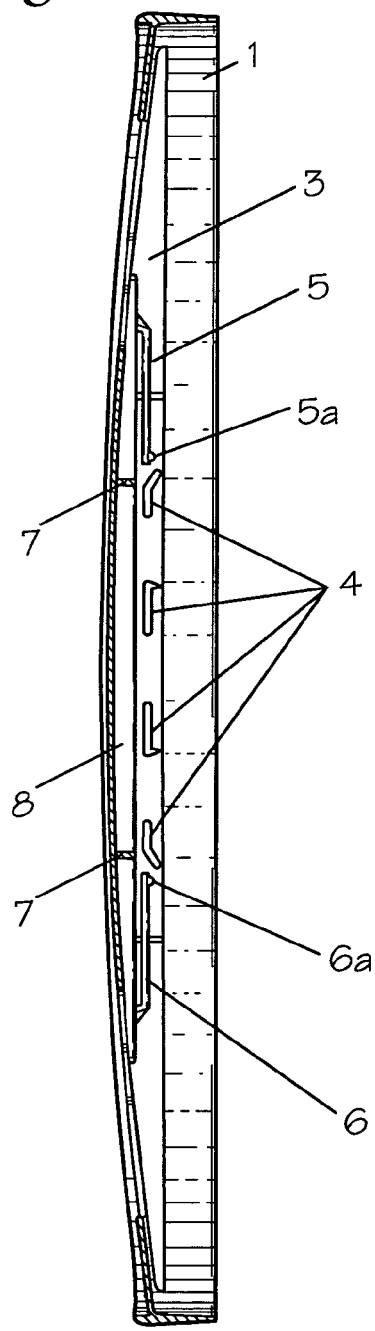
FIG. 2 is a side section view through the mirror support plate along line C—C in FIG. 1.
Figure 3:
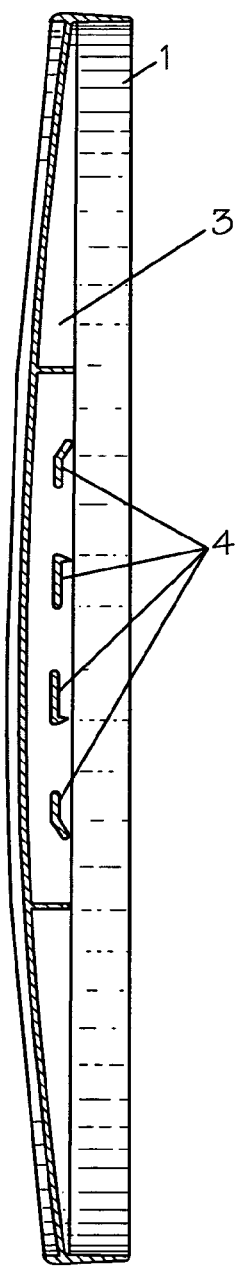
FIG. 3 is a side section view through the mirror support plate along line A—A in FIG. 1.
Figure 4:
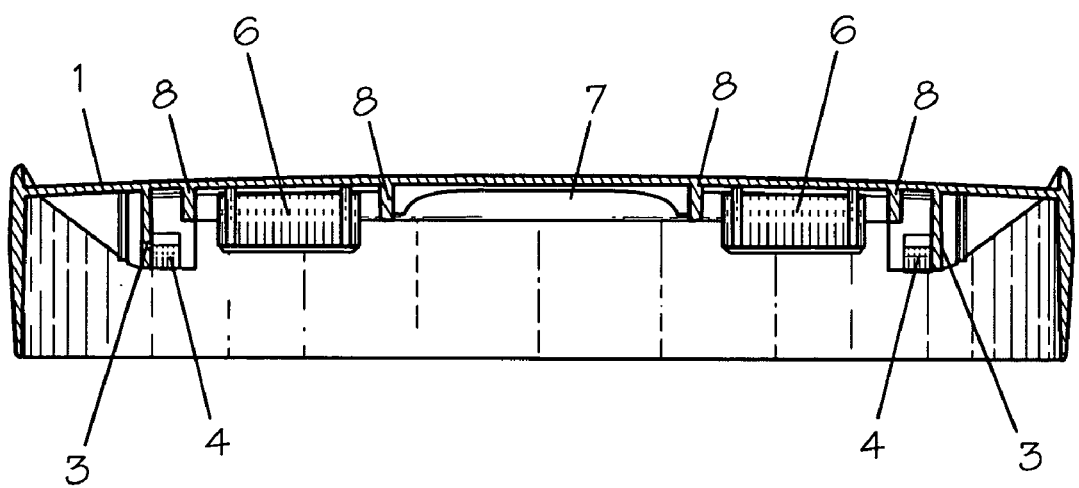
FIG. 4 is a top section view through the mirror support plate along line B—B in FIG. 1.

The mirror support plate 1 further comprises two first elastic or resilient elements 5 made of plastic and formed integral with the mirror support plate. Elastic elements 5 extend in the form of tongues in the direction of and generally parallel with the ridges 3. On the inner end and upper side of the first elastic elements away from the back of the mirror support plate 1 in FIGS. 2 and 5 are formed projections 5a.

The mirror support plate comprises two additional second elastic elements 6 to include projections 6a which are symmetrical to the first elastic elements 5 relative to the transversal axis going from left to right in FIG. 1 of the mirror support.

The holder 2 can now be inserted from either the top or bottom of the mirror support plate as shown in FIGS. 1–5 between the back of the mirror support plate 1 and the projections 4.

If the holder is inserted from the bottom in FIG. 1, it deforms downwardly the second, i.e. lower elastic elements 6 during insertion. When it is fully inserted it presses interlockingly against the ends 5a of the first elastic elements 5 which act as an upper stop in the insertion direction without being deformed. The lower or second elastic elements 6 spring back either fully or only slightly when the holder 2 is fully Inserted causing the lower projections 6a to reach or extend behind the lower border region of the holder 2. The holder 2 is thus prevented from sliding out and is, at the same time, pressed against the projections 4 of the ridges 3, thus increasing the frictional engagement. To open the chucking and sliding connection, mirror support plate 1 is pushed downward from the holder top. The holder, thereby, exerts a force upon projections 6a of the lower elastic elements 6, which due to the geometry of the projections 6a deforms the elastic elements elastically downward or towards the back of the mirror support plate, thus releasing the holder 2.

If the mirror support plate is to be used on the other vehicle side it is rotated around its axis as shown in of FIG. 1 and is then inserted into the opposite side the holder in the manner above described. For this, the functions of the first and second elastic elements 5 and 6 are reversed, i.e. the first elastic elements 5 function as the lower elastic elements which are elastically deformed during the insertion. The second elastic elements 6 represent the upper stop against which the holder is interlockingly pressed.

Due to the fact that the first as well as the second elastic elements can be deformed elastically, they are able to make room as lower elastic elements when an insertion moment of the holder takes place. Thus, a mirror support plate according to the invention has two possible upper stops across from each other against which the inserted holder is pressed, depending on the direction of insertion, whereby each stop is able to make room elastically when the holder is inserted from its side.

While a preferred embodiment of the invention has been described using specific terms, such description is for illustrative purposes only, and it is to be understood that changes and variations may be made without departing from the spirit or scope of the following claims.

What is claimed is:

1. A mirror support plate having an upper and a lower edge for use with right and left sides of vehicles which is slidable and engageable with a holder by means of a chucking and sliding connection comprising:
   said mirror support plate having two substantially parallel ridges which protrude from its back, said ridges each having at least one inwardly directed projection providing engaging surfaces which frictionally engage with a border region of the holder when said holder is inserted between the back and the projections;
   said mirror support plate being provided with a first elastic element and a second elastic element arranged in longitudinally spaced positions and which are each operative to function as a lower and an upper elastic element depending upon the position of said upper and lower edges when attached with said holder, wherein;
   during insertion of the mirror support plate from said upper edge only said first of said elastic elements is biased elastically towards the back of the mirror support plate to spring back into interlocking contact with said holder when said holder is fully seated with said support plate and during insertion of the mirror support plate from said lower edge only said second of said elastic elements is biased elastically towards the back of the mirror support plate to spring back into interlocking contact with said holder when said holder is fully seated with said support plate.

2. The mirror support plate of claim 1, wherein the elastic elements are made of plastic.

3. The mirror support plate of claim 2, wherein the mirror support plate and the elastic elements are made in one piece.

4. The mirror support plate of claim 1, wherein each said ridge has several of said projections.

5. The mirror support plate of claim 1, wherein said first and second elastic elements are identical.

6. The mirror support plate of claim 1, wherein said elastic elements are made in form of tongues.

7. The mirror support plate of claim 1, wherein each said elastic element includes a protrusion on its side away from the back of the mirror support plate and adjacent its inner end, said projection of the lower elastic element being operative to extend behind the holder in the inserted position.

8. The mirror support plate of claim 1, wherein said first and second elastic elements each comprise several elastic elements.

9. The mirror arrangement of claim 1, wherein said mirror support plate is engageable with said holder by way of a chucking and sliding connection.

10. A reversible mirror support plate for use with vehicles having a front side for supporting a mirror pane and a back side for attaching with a left or right side vehicle mirror mount;
    said back side includes a pair of raised ridges arranged in spaced parallel positions and forming an entry, exit path for said mirror mount;
    at least one projection extending inwardly from each said ridge in spaced positions from said back;
    a first elastic element arranged between said ridges substantially adjacent first end of said support plate and a second elastic element arranged between said ridges substantially adjacent a second end of said support plate, said first and second elastic elements being arranged in opposed relation; whereby,
    said mirror mount may be positioned against said support plate to depress a lower of said elastic elements and slid upward until its side borders are engaged beneath said projections with its upper border edge engaged with an upper of said elastic elements whereupon said lower elastic element rebounds to engage with the lower border edge of said mirror mount, securing said mirror support plate with said mirror mount.

11. The mirror support plate of claim 10, wherein said first elastic element comprises said lower elastic element when said mirror support plate is mounted with the left side mirror mount.

12. The mirror mount of claim 10, wherein said second elastic element comprises said lower elastic element when said mirror support plate is mounted with the right side mirror mount.

13. The mirror support plate of claim 10, wherein said mirror support plate is molded plastic.

14. A method of securing a mirror support plate with a mirror mount on left or right vehicle sides including:
    providing a mirror support plate having a back with a pair of ridges forming an entry, exit path with opposed entry, exit ends;
    providing inwardly directed projections from said ridges in position to engage over outer edges of said mirror mount when positioned between said ridges;
    providing first and second elastic elements on said mirror support plate, in longitudinally spaced positions along said path adjacent said entry, exit ends;
    positioning said mirror support plate adjacent said mirror mount and depressing a lower of said first and second elastic elements while inserting said mirror mount along said path into a secured position with said mirror support plate in which said projections engage over outer edges of said mirror mount with its upper edge engaged with an upper of said first and second elastic elements; and
    its lower edge engaged with a lower of said first and second elastic elements.

* * * * *